UNITED STATES PATENT OFFICE.

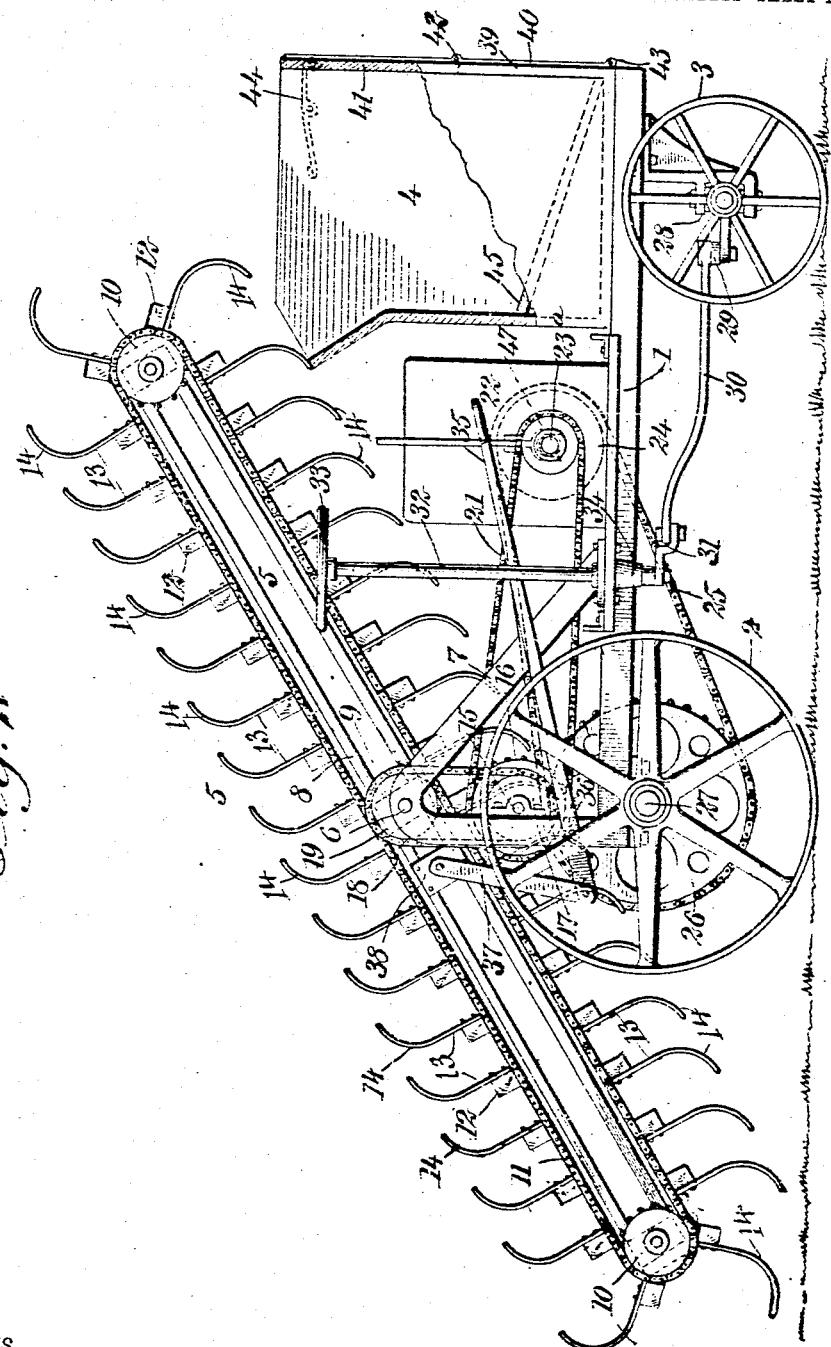

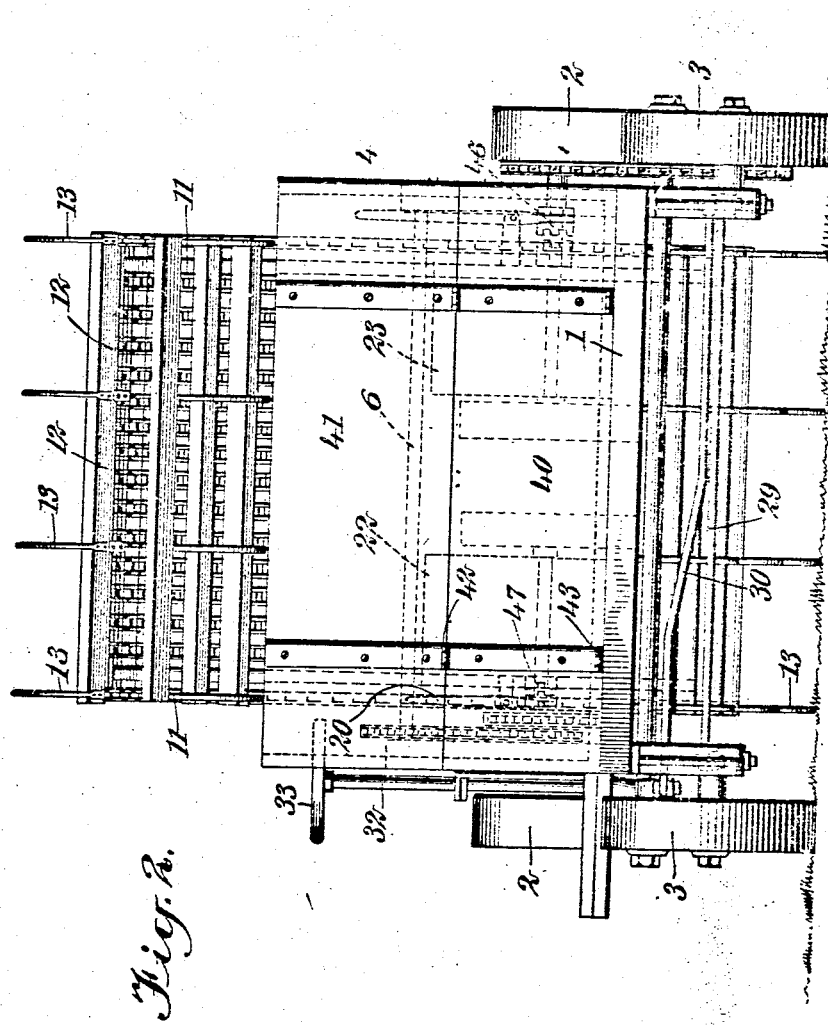

JACKSON RANDOLPH MYERS, OF KILAUEA, TERRITORY OF HAWAII.

CANE-LOADING DEVICE.

No. 892,289.   Specification of Letters Patent.   Patented June 30, 1908.

Application filed March 30, 1907. Serial No. 365,479.

*To all whom it may concern:*

Be it known that I, JACKSON RANDOLPH MYERS, a citizen of the United States, and a resident of Kilauea, Kauai, Hawaii, have invented a new and Improved Cane-Loading Device, of which the following is a full, clear, and exact description.

This invention relates to mechanism for loading sugar cane or similar product upon cars or wagons.

The object of the invention is to produce a mechanism of this kind which is simple in construction and which can be readily manipulated so as to raise the cane from the ground and deposit the same in a wagon or similar vehicle, for transportation to the mill.

The invention consists in the construction and combination of parts to be more fully described hereinafter and particularly set forth in the claims.

Reference is to be had to the accompanying drawings forming a part of this specification, in which similar characters of reference indicate corresponding parts in both figures.

Figure 1 is a side elevation of the device, a portion of the body or box for the cane being shown in section; and Fig. 2 is a rear elevation of the machine shown in Fig. 1.

Referring more particularly to the parts, 1 represents the frame of the machine, which is mounted upon large wheels 2 at one extremity and steering wheels 3 at the opposite extremity. Over the steering wheels 3 I provide a body or box 4, which is adapted to receive the cane from a carrier 5. This carrier is supported upon a transverse horizontal shaft 6, the ends of which are supported in side frames 7 mounted on the main frame 1. These frames 7 are disposed at the end of the frame 1 adjacent to the wheels 2 and remote from the box 4. The carrier 5 comprises a boom 8, which is provided at its middle point with blocks 9 which are rotatably mounted upon the shaft 6. At the ends of the boom 8 I provide guide pulleys 10 about which pass a plurality of endless belts 11. These endless belts are provided with transverse bars or cleats 12 to which are attached a plurality of arms 13. These arms extend outwardly at right angles from the belts, and their outer extremities are formed with hooks 14 which project forwardly with respect to the direction in which the belts are advanced.

Upon one of the frames 7 below the shaft 6 I provide a stub shaft 15, and this stub shaft carries rigidly sprocket wheels 16 and 17, the latter of which is of reduced diameter and is connected by a sprocket chain 18 with a similar sprocket wheel 19 rotatably mounted on the shaft 6 aforesaid. This sprocket wheel 19 is rigid with a similar sprocket wheel 20, the teeth of which mesh with the aforesaid belts 11. From this arrangement it should be understood that when the sprocket wheel 16 is driven, the carrier 5 will be continuously operated. In order to drive the carrier as suggested, I provide a driving sprocket chain 21, which passes around the sprocket wheel 16, and this chain is driven through the medium of a motor 22 mounted on the frame 1, as indicated.

I provide means for advancing the entire machine, for which purpose I arrange a motor 23 upon the frame at the right, as viewed in Fig. 2, and the shaft 23ᵃ of this motor is provided with a sprocket wheel 24 over which runs a sprocket chain 25, the forward bight of this chain passing around a sprocket wheel 26 which is rigidly mounted on the main axle 27 carrying the wheels 2, as indicated. From this arrangement it should be understood that the carrier may be operated independently of the advance of the machine.

In order to steer the machine, the wheels 3 are mounted upon steering knuckles 28, said knuckles being connected by a tie rod 29. At a suitable point, a pitman 30 is attached to the tie rod 29, and this pitman is actuated by an arm 31 carried at the lower extremity of a steering spindle 32, the said spindle being mounted in a vertical position at a convenient point to be reached by the operator of the machine. Its upper extremity is furnished with a steering wheel 33 as shown. At its foot, it is mounted in a suitable bearing 34 attached to the frame as indicated. It should be understood that by means of the motor 23, the machine will be advanced so that the forward extremity of the carrier 5 may be presented to the cane lying upon the ground. By means of a lever 35, which is fulcrumed at 36 on one of the frames 7, the carrier may be tilted, through the medium of a link 37 which connects the lever with the boom at the point 38 as shown. In this way the forward extremity of the carrier may be depressed or elevated so as to adapt it to the position of the cane and to variations in the ground level. It will be understood, of course, that the carrier is driven so that the arms travel upwardly on the upper side of the machine, and so that the arms as they pass near the ground, will pick up the cane and carry the same toward the box 4. As indicated in Fig. 1, the upper end of the carrier is disposed over the box 4 so that the cane will be dumped into it. The rear side of the box 4 is closed by a door 39 which is formed in sections 40 and 41, hinged together at 42, as indicated. The lower section 40 is connected by hinges 43 to the lower edge of the box, and near its upper extremity, the section 41 is locked in position by means of a suitable hook 44, as shown in Fig. 1. The bottom 45 of the box is preferably inclined rearwardly, as shown, so that when the door 39 is let down, the cane can be readily removed.

Attention is called especially to the fact that whatever be the position of the boom 8, the carrier may be operated efficiently through the sprocket chain 18.

The motor 23 not only affords means for shifting the machine in picking up the cane, but it enables the machine to move itself from place to place, as desired, so that the cane may be picked up and carried to the point where it is to be dumped.

On the shaft 23ª of the motor, two friction clutches 46 and 47 are arranged, as shown, so that the machine may be advanced without driving the carrier, and the carrier can be driven without advancing the machine; or the machine may be advanced simultaneously with the driving of the carrier.

Having thus described my invention, I claim as new and desire to secure by Letters Patent:

In a cane-loader, in combination, a frame mounted upon wheels, a transverse shaft mounted at the forward end of said frame, a carrier mounted pivotally upon said shaft, endless chains guided on said carrier, a sprocket wheel rigidly attached to said shaft, means for driving said sprocket wheel, a second sprocket wheel rigid with said shaft and disposed between the runs of said chain, said chain having attachments thereupon adapted to pick up the cane from the ground and raise the same, and a lever for moving said carrier.

In testimony whereof I have signed my name to this specification in the presence of two subscribing witnesses.

JACKSON RANDOLPH MYERS.

Witnesses:
  FRANK SCOTT,
  M. C. SOUZA.